United States Patent [19]
Söhngen

[11] Patent Number: 4,594,053
[45] Date of Patent: Jun. 10, 1986

[54] HOUSING FOR A FLUID FLOW OR JET ENGINE

[75] Inventor: Joachim Söhngen, Munich, Fed. Rep. of Germany

[73] Assignee: MTU Motoren-und Turbinen-Union Muenchen GmbH, Munich, Fed. Rep. of Germany

[21] Appl. No.: 715,494

[22] Filed: Mar. 25, 1985

[30] Foreign Application Priority Data

Apr. 10, 1984 [DE] Fed. Rep. of Germany ....... 3413534

[51] Int. Cl.$^4$ .................................. F01D 11/08
[52] U.S. Cl. ................................ 415/174; 277/53; 415/200; 427/34; 427/423; 428/632
[58] Field of Search .............. 415/200, 174, 197; 277/53; 428/593, 598, 632, 937, 116, 117, 118, 555; 427/34, 423

[56] References Cited

U.S. PATENT DOCUMENTS

| | | | |
|---|---|---|---|
| 3,126,149 | 3/1964 | Bowers, Jr. et al. | 415/200 X |
| 3,295,941 | 1/1967 | Spellman | 428/632 X |
| 4,227,703 | 10/1980 | Stalker et al. | 415/174 X |
| 4,280,975 | 7/1981 | Ammann | 415/200 X |
| 4,289,447 | 9/1981 | Sterman et al. | 415/200 |
| 4,405,284 | 9/1983 | Albrecht et al. | 415/174 |
| 4,433,845 | 2/1984 | Shiembob | 415/174 X |

OTHER PUBLICATIONS

Lubrication Engineering (1981) Apr., pp. 103 to 106.

*Primary Examiner*—Leonard E. Smith
*Attorney, Agent, or Firm*—W. G. Fasse; D. H. Kane, Jr.

[57] ABSTRACT

A coolable housing wall for hot gas fluid flow engines, especially for a gas turbine of the air jet type, is provided on its radially inwardly facing surface with a carrier for a single cover layer forming a running-in coating. The cover layer is applied by thermal spraying to form a ceramic coating having a high heat and corrosion resistance. The single cover layer has a substantially uniform thickness and projects radially inwardly from the carrier, preferably by forming ridges facing the blade tips of a rotor in the housing. Such cover layer also has a high erosion resistance.

10 Claims, 2 Drawing Figures

HOUSING FOR A FLUID FLOW OR JET ENGINE

FIELD OF THE INVENTION

The invention relates to a housing for a fluid flow or jet engine. The housing includes features for minimizing or holding constant the gap or clearance between the tips of the rotor blades and the radially inwardly facing surface of the engine housing. Such features are required in fluid flow engines because due to non-stable operating conditions variations of the just mentioned gap or clearance occur, which are undesirable, especially between the rotor blade tips and the inwardly facing housing wall.

DESCRIPTION OF THE PRIOR ART

When a fluid flow engine is subject to accelaration its housing or a housing jacket assumes relatively quickly the temperature of the gases, because the housing or housing jacket has a relatively small mass and a large surface area. On the other hand, the rotor has a comparatively large mass and a small surface area relative to the rotor volume. Accordingly, the rotor reacts more slowly to thermal changes. As a result, the above mentioned gap or clearance between the two components is increased, which in turn causes a power loss or a reduction in the efficiency. Further, such increase in the gap reduces the surge limit gap or clearance of the compressor driven by the engine.

When the engine is subject to decelaration the situation is exactly the opposite to the one described in the preceding paragraph. As a result, the gap becomes smaller and the rotor blades are subject to running-in or abrasion conditions or they may be exposed to damage in any other manner due to the gap width reduction.

Various efforts have been made heretofore, to reduce losses caused by so-called gap losses and to proportionally improve the overall efficiency of the fluid flow turbo engine. One prior art approach involves increasing the mass of the housing. Another prior art housing construction involves a double wall type structure for insulation purposes. It is also known to cool the housing in a controlled manner, for example, by blowing air onto the housing to achieve a so-called active clearance control of the gap.

German Patent Publication No. (DE-OS)30 38 371 corresponding to U.S. Ser. No. 84,244 filed Oct. 12, 1979, now U.S. Pat. No. 4,289,447, discloses a metal-ceramic turbine engine jacket comprising so-called matrix connecting means, such as a wire mesh grid structure to produce an orderly, pre-determined pattern of very fine cracks or fissures. The wire mesh or grid structure forms a metal substrate in which the depressions are filled out by several intermediate layers and by the ceramic cover layer. The fine fissures in the pattern are capable of reducing thermal loads or thermal stresses. However, the fine fissures have the disadvantage, that the ceramic cover has reduced corrosion and erosion resistances at high temperatures.

According to an article in "Lubrication Engineering", April 1981, pages 209 to 216, entitled "Some considerations of the Performance of two Honeycomb Gas Path Seal Material Systems" by Bill et al, it is also known to use a honeycomb structure as a sealing feature and to diffusion coat the honeycomb structure with an aluminum-rich surface layer of about 5 micron thickness. The purpose of such a protective $Al_2O_3$ layer is to provide an improved oxidation resistance for the metal of the honeycomb structure. An erosion and corrosion improvement is not achieved by such an aluminum oxide layer.

Efforts have also been made heretofore, to improve the overall efficiency of fluid flow engines, such as turbines, by substantially increasing the turbine entrance temperature. However, for such efforts to be successful, it is necessary, that the wall surfaces, for example of the housing, which are exposed to the hot gas flow must have an increased erosion and corrosion resistance. Aluminum oxide layers provided for protection against oxidation are of no help in this respect. Further, the ceramic materials known for this purpose have such a high brittleness, that they cannot satisfy the requirements for good running-in characteristics.

OBJECTS OF THE INVENTION

In view of the above it is the aim of the invention to achieve the following objects singly or in combination:

to provide a solution for the above outlined problems, more specifically, to keep the gap in fluid flow engines operating with hot gases, especially gas turbine engines, small at the rotor tips through an operational range as large as possible, including non-stable operational states;

to keep the gap not only small, but actually also constant through the mentioned operational range; and to make sure, that the features necessary for maintaining the gap small and constant also satisfy the requirements for good running-in characteristics, while simultaneously having a large service life or being capable of withstanding a large number of operational cycles.

SUMMARY OF THE INVENTION

The housing for a fluid flow engine, expecially a gas turbine engine according to the invention is characterized by the combination of the following features. The housing wall surrounding and facing the rotor is provided with a metallic rib carrier with recesses and ribs surrounding the recesses facing the rotor. The carrier structure is rigidly secured to the housing wall, for example by soldering. The metallic carrier is coated with a cover layer which is rub-tolerant and made of stabilized zirconium oxide forming a corrosion resistant and erosion resistant ceramic material. This ceramic material is formed by thermal spraying of a stabilized zirconium powder onto the housing wall and the carrier structure. The powder has irregularly shaped fine grained particles, filling the recesses and covering the ribs to form a continuous layer intimately bonded to the carrier structure by the thermal spraying, such as plasma spraying, directly onto the carrier structure. The cover layer forms ridges on the ribs of the carrier structure and these ridges of zirconium oxide ceramic material project toward the rotor. These ridges are relatively narrow and face the rotor blade tips directly.

The most important advantages of the invention are seen in that because of the relatively narrow ridges it is possible to use stabilized zirconium oxide as abradable layer; furthermore the structure of the housing has been substantially simplified in that it is no longer necessary to coat the inwardly facing surface of the housing with several layers. The invention avoids such plurality of layers one of which had to be a heat insulation layer or a heat barrier in the prior art. The invention also avoids packings of insulating material as well as preformed ceramic components. By using but a single layer of a special ceramic material, namely zirconium oxide, having a selected structure resulting from the thermal or plasma spraying, the housing construction has been substantially simplified, because the layer can be simply applied. Additionally, such a layer has the advantage to be heat resistant up to high temperatures, while simultaneously having a high erosion and corrosion resistance in combination with a small heat conductivity and a high flame reflection. Further, the formation of the above mentioned ridges of ceramic material, as a result of the metallic rib carrier structure results in a surface formation which has surprisingly good running-in characteristics.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
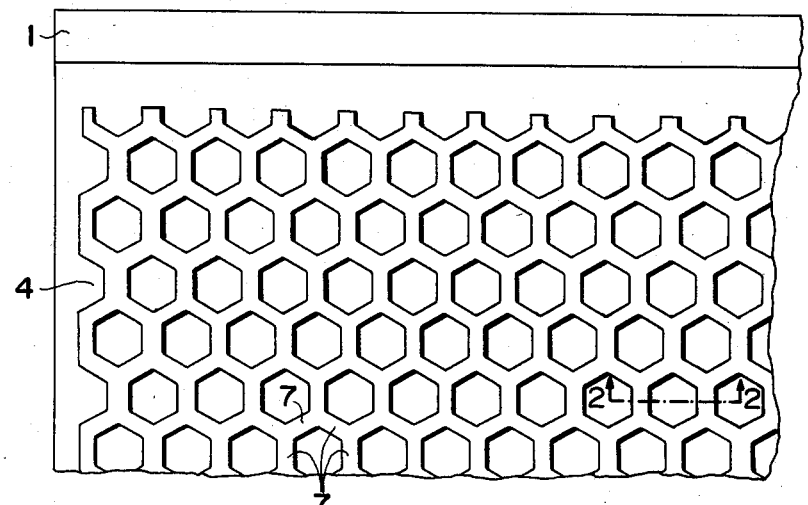
FIG. 1 is a top plan view of a portion of a housing wall, according to the invention, for a fluid flow engine as viewed from the rotor radially outwardly.

FIG. 1 shows a portion of a housing wall 1 of a fluid flow engine, especially a gas turbine, as viewed radially outwardly. A metallic honeycomb type structure 4 is rigidly secured to the wall 1, by means of a soldering or brazing seam 8. The honeycomb type structure 4 comprises ribs 5 facing toward the rotor tips not shown. The housing wall is preferably made of an alloy known as INCONEL (registered trademark of The International Nickel Co. Inc.). That is, of an alloy on a nickel basis. The honeycomb type structure 4 is preferably also made of a nickel base alloy, such as "HASTELLOY" (registered trademark of the Union Carbide Corporation).

Figure 2:
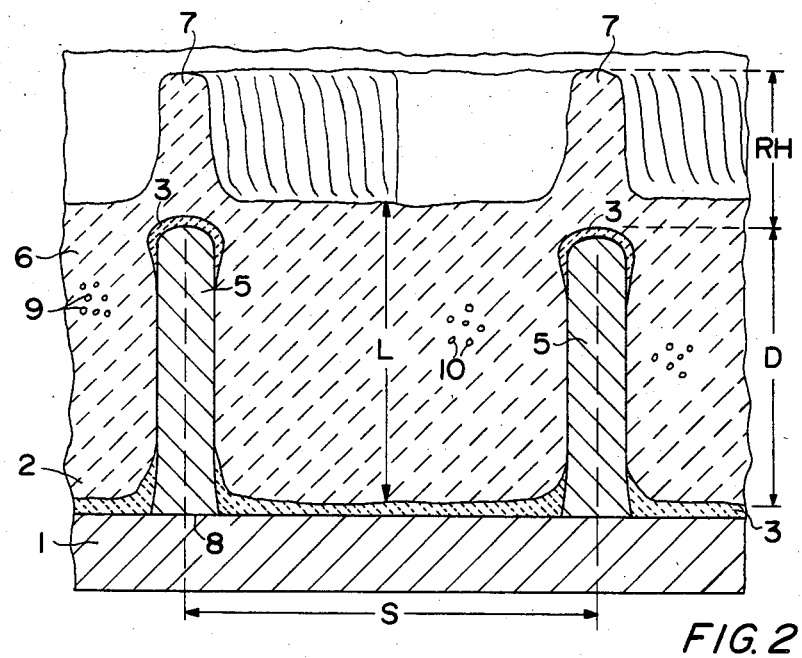
FIG. 2 is a sectional view, on an enlarged scale, along section line 2—2 in FIG. 1.

Once the structure 4 is secured to the wall 1, the ceramic layer 6 is applied onto the wall 1 and onto the ridges of ribs 5 as shown in FIG. 2. The application may be accomplished by thermal spraying, for example plasma spraying, to form the layer 6 to the desired thickness. Flame spraying may also be employed. The layer 6 is a zirconium oxide powder, which has been stabilized by additions of yttrium oxide or magnesium oxide or calcium oxide. A successful powder mixture comprises 93% by weight zirconium oxide and 7% by weight yttrium oxide of the total mixture. However, the powder mixture may be modified with regard to the weight proportions of the composition as well as with regard to the shape of the particles. Preferably, the particle shape should be irregular and rather fine grained with grain sizes primarily in the range of 10 to 100 microns. Further, the layer application may also be accomplished by using a fluid stabilized zirconium oxide or a fluidized composition of the components making up the mixture.

As shown in FIG. 2, the cover layer 6 forms ridges 7 which conform in their pattern to the honeycomb type pattern of said structure 4. The ridges 7 project above the ribs 5 toward the rotor blade tips. Especially these ridges provide the above mentioned desirable good running-in characteristics. The layer 6 fills the recesses between adjacent ribs 5 substantially or completely and the ridges 7 have an approximately rectangular cross-sectional shape as shown. The ridges 7 have a radial height RH above the honeycomb type ribs 5 within the range of about 1 to 5 mm. Further, the honeycomb structure 4 has a depth D which is smaller than the layer thickness L. The layer thickness L is, for example, within the range of about 1 to 15 mm. The radial depth D of the structure 4 should correspond to approximately between one and one fourth of the spacing S between two parallel ribs 5, as best seen in FIG. 2, $D \approx 1S - \frac{1}{4}S$.

The protective layer 6 may comprise embedded therein metallic particles 9 and/or glass particles 10. The proportion of such additive particles may be within the range of 5 to 75 in percent by weight of the total mixture.

Incidentally, the radial height RH of the ridges 7 is greater than their width. Further, the preferred range within the above mentioned range of 1 to 15 mm for the thickness of the layers 6 is about 1 to 2 mm.

The following parameters have been found to be very successful for a spraying operation:

Primary Gas: Ar or $N_2$
Secondary Gas: $H_2$
Power Rating: about 15 to 50 kw
Plasma Spraying Tool: Plasmatechnik or Metco (Spraying Pistol)
Nozzle Diameter about: 4 to 6 mm
Carrier Gas: $N_2$
Powder Consumption: 20 to 60 g/min
Spraying Clearance: 50 to 80 mm
Spraying Powder: $ZrO_2:Y_2O_3$ 93:7 (% by weight)
Particle Size: 10 to 100 microns
Particle Shapes: irregular The powder is heated in the plasma to temperatures exceeding $10^{5°}$ K. to provide a melt which is then accelerated to velocities exceeding Mach 1.

A gas turbine equipped with a housing having a cover layer as disclosed herein made of a uniform ceramic material of high durability has been subjected to several thousand operational cycles at hot gas temperatures exceeding 1000° C., especially exceeding 1300° C. After such test cycles a layer loss worth mentioning could not be found. As a result, the gap between the rotor blade tips and the inner housing wall can be kept small and substantially constant. The running-in takes place simultaneously with the known cooling of the inner housing wall by blowing air onto the inner housing wall. Such blowing air may for example be taken from the compressor end of the gas generator. This combination of features has resulted in a substantially increased overall efficiency.

The invention is preferably used in connection with air jet engines. However, it is equally useful in other fluid flow engines comprising axial flow turbines exposed to the hot gas.

The teaching of the invention may also be realized by forming a spray layer with other ceramic materials provided that the surface structure or configuration according to the invention is achieved. For achieving such surface structure configuration it is necessary, that the respective ceramic powder provides after spraying a sufficiently fragile, yet corrosion and erosion resistant surface structure in the cover layer 6. Usually, an intermediate layer 3 is provided between the surface of the wall 1 and the ceramic cover layer 6 to improve the bonding between the ceramic cover layer 6 and the wall 1. One or several such bond-improving layers may be used. Such layers may comprise for example M Cr Al Y (M=Ni, Co, NiCo, Fe), Ni Cr Al and metal-ceramic mixtures. The soldering or brazing layer between the housing wall 1 and the honeycomb structure 4 preferably consists of Ni-based solder, e. g. acc. to AMS 4777. As mentioned above, the ceramic cover layer 6 may have embedded therein particles or fibers of other materials, such as metal, glass, metal-ceramic combinations or glass ceramic combinations.

These additive materials can be applied simultaneously with the thermal spraying and/or they may be connected with the layer 6 for reinforcing the layer 6. Incidentally, the layer thickness L will be selected in accordance with the individual requirements. However, the above mentioned preferred range of 1 to 2 mm has been found to be quite useful.

Although the invention has been described with reference to specific example embodiments, it will be appreciated, that it is intended, to cover all modifications and equivalents within the scope of the appended claims.

What I claim is:

1. A housing for a fluid flow engine, comprising a coolable housing wall means having a radially inwardly facing surface, a metallic rib carrier means including recesses being rigidly secured to said radially inwardly facing surface of said housing wall means, and a cover layer applied by thermal spraying to said wall surface and said ribs of the metallic rib carrier means, said cover layer comprising a rub-tolerant stabilized zirconium oxide forming a corrosion and errosion resistant ceramic material made of stabilized zirconium oxide powder of irregularly shaped, fine-grained particles which substantially completely fill said recesses, said particles covering said rib carrier means to form said cover layer as an uninterrupted coating intimately bonded by said thermal spraying to said metallic rib carrier means, said cover layer further forming relatively narrow ridges on the ribs of said rib carrier means, said ridges projecting above said ribs radially inwardly for directly facing blade tips of a rotor in said housing, whereby a gap between said housing means and said rotor may be maintained substantially constantly at a minimal gap width.

2. A housing of claim 1, wherein said metallic rib carrier means is a honeycomb type structure.

3. The housing of claim 1, wherein said projecting ridges have a width approximately similar to the width of the ribs of said rib carrier means and a radial height greater than their width.

4. The housing of claim 1, wherein said projecting ridges have a radial height above said rib carrier means within the range of about 1 to 5 mm.

5. The housing of claim 1, wherein the recesses of said rib carrier means have a given depth, and wherein said protective layer has a radial thickness larger than said given depth so that said layer is thicker than said given depth.

6. The housing of claim 1, wherein said protective layer has a thickness in the range of about 1 to 15 mm.

7. The housing of claim 1, wherein said rib carrier means comprises rib elements defining said rib carrier recesses so that there is a defined spacing between two parallel rib elements, said rib elements having a radial dimension which corresponds approximately between one and one forth of said defined spacing.

8. The housing of claim 1, wherein said protective layer comprises metallic particles.

9. The housing of claim 1, wherein said protective layer comprises glass type particles.

10. The housing of claim 1, wherein said cover layer completely fills said recesses in said rib carrier means.

* * * * *